(12) United States Patent
Keller et al.

(10) Patent No.: US 11,084,407 B2
(45) Date of Patent: Aug. 10, 2021

(54) SEAT ARMREST AND SEAT WITH ARMREST

(71) Applicant: GRAMMER AG, Ursensollen (DE)

(72) Inventors: Hubert Keller, Kuemmersbruck (DE); Erwin Himmelhuber, Sulzbach-Rosenberg (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 15/761,381

(22) PCT Filed: Sep. 29, 2016

(86) PCT No.: PCT/DE2016/000358
§ 371 (c)(1),
(2) Date: Aug. 13, 2018

(87) PCT Pub. No.: WO2017/054794
PCT Pub. Date: Apr. 6, 2017

(65) Prior Publication Data
US 2018/0339627 A1 Nov. 29, 2018

(30) Foreign Application Priority Data
Sep. 30, 2015 (DE) ..................... 10 2015 012 632.6

(51) Int. Cl.
*B60N 2/75* (2018.01)
*B60N 2/90* (2018.01)
*F16F 1/37* (2006.01)

(52) U.S. Cl.
CPC ............. *B60N 2/938* (2018.02); *B60N 2/767* (2018.02); *F16F 1/37* (2013.01); *F16F 2224/0225* (2013.01)

(58) Field of Classification Search
CPC ........ B60N 2/938; B60N 2/943; B60N 2/763; B60N 2/767; F16F 1/37; F16F 2224/0225; B64D 11/0644; A47C 7/541
(Continued)

(56) References Cited

U.S. PATENT DOCUMENTS

| 4,244,623 | A | * | 1/1981 | Hall | .......................... | A47C 1/03 |
| | | | | | | 297/411.36 |
| 4,828,323 | A | * | 5/1989 | Brodersen | ................ | B60N 2/77 |
| | | | | | | 297/411.36 |
| 5,033,792 | A | * | 7/1991 | Kanazawa | ............. | B60N 2/753 |
| | | | | | | 297/411.32 |

(Continued)

FOREIGN PATENT DOCUMENTS

| DE | 102005055138 A | 5/2007 |
| DE | 102009057536 A | 3/2011 |

(Continued)

*Primary Examiner* — Kyle J. Walraed-Sullivan
(74) *Attorney, Agent, or Firm* — Andrew Wilford

(57) ABSTRACT

The invention relates primarily to an armrest with an arm support (11) pivotable about an axis (a) between an upper end position and a lower end position, with a locking mechanism (13) movable between a locked position and a released position, comprising first detent (14) on the arm support (11) and second detent (15) on a structure (12) with fixed position, wherein the first detent (14) and the second detent (15) are engaged when the locking mechanism (13) is in a locked position and are disengaged when the locking mechanism is in a released position.
The special feature thereof consists in that at least a partial range of the movement of the locking mechanism (13) in at least one direction between the released position and the locked position takes place in damped manner by a damping element (26).

9 Claims, 6 Drawing Sheets

(58) Field of Classification Search
USPC .................................................. 297/411.38
See application file for complete search history.

(56) References Cited

U.S. PATENT DOCUMENTS

| | | | | |
|---|---|---|---|---|
| 5,823,624 A * | 10/1998 | Dahlbacka | ............... | A47C 1/03 297/411.36 |
| 5,971,484 A * | 10/1999 | Lamart | ................... | A47C 1/03 297/115 |
| 7,341,313 B2 * | 3/2008 | Bedford | ................... | A47C 1/03 297/411.36 |
| 9,272,645 B2 | 3/2016 | Boehner | | |
| 10,279,917 B1 * | 5/2019 | Wilkey | ................ | B64D 11/064 |
| 2003/0197413 A1 * | 10/2003 | Walker | ................... | B60N 2/002 297/452.19 |
| 2004/0080173 A1 * | 4/2004 | Niwa | ................... | B60N 2/773 296/24.34 |
| 2005/0200186 A1 * | 9/2005 | Schumacher | ........ | B60N 2/3047 297/411.38 |
| 2006/0042857 A1 * | 3/2006 | Catton | ................... | B60N 2/767 180/334 |
| 2008/0030061 A1 * | 2/2008 | Pejathaya | ............... | B60N 2/856 297/367 R |
| 2013/0076096 A1 * | 3/2013 | Pacolt | ................... | B60N 2/767 297/411.38 |
| 2014/0159461 A1 * | 6/2014 | Mochizuki | ............. | A47C 7/543 297/411.32 |
| 2015/0091318 A1 * | 4/2015 | Bohner | ................. | B60N 2/767 296/1.09 |
| 2015/0375595 A1 * | 12/2015 | Fesenmyer | ........ | B60H 1/00271 296/37.14 |
| 2016/0052428 A1 * | 2/2016 | Hessdorfer | ............. | B60N 2/43 297/411.32 |

FOREIGN PATENT DOCUMENTS

| | | |
|---|---|---|
| DE | 102011107248 A | 1/2013 |
| DE | 102011114442 A | 3/2013 |
| DE | 202012009578 A | 11/2013 |

* cited by examiner

SEAT ARMREST AND SEAT WITH ARMREST

CROSS REFERENCE TO RELATED APPLICATIONS

This application is the US-national stage of PCT application PCT/DE2016/000358 filed 29 Sep. 2016 and claiming the priority of German patent application 102015012632.6 itself filed 30 Sep. 2015.

FIELD OF THE INVENTION

The invention relates primarily to an armrest for a seat, particularly for a seat in a motor vehicle.

BACKGROUND OF THE INVENTION

Such an armrest is known from publicly known prior use. It comprises an arm support part that may pivot about an axis. The axis may be formed for example by the vehicle structure or the vehicle seat. The arm support section is lockable in various positions by a latch. The latch comprises first detent on the arm support section and second detent arranged on a structure of the vehicle.

The latch is displaceable between a locked position and a released position. The displacement into the released position may be carried out manually for example. When returning to the locked position, the first and second detent engage with each other, giving rise to an undesirable noise.

OBJECT OF THE INVENTION

It was the object of the invention to create an armrest with a locking mechanism that is improved in terms of noise emission.

SUMMARY OF THE INVENTION

According to the invention the armrest comprises an arm support pivotable about an axis. The axis is on a structure relative to which the arm support is movable. The axis is assigned for example to a seat structure or a vehicle structure. The arm support is pivotable between an upper end position and a lower end position. The arm support may be adjusted to various intermediate positions between the upper end position and the lower end position.

The armrest comprises a locking mechanism with which the arm support is lockable in different positions. The locking mechanism is movable between a locked position and a released position. In the locked position, the arm support is not movable in at least one pivoting direction, for example. For example, the arm support is freely movable in a first pivoting direction and not movable in a second pivoting direction. According to an alternative design, the arm support is immovable in both pivoting directions when the locking mechanism is in the locked position, for example. In the released position, the arm support may be pivoted freely in both pivoting directions—within a maximum pivoting range, for example—in both embodiments.

The locking mechanism comprises first detent on the arm support, and second detent on a structure. The structure is for example the seat structure or the vehicle structure. The second detent may be on the same structure as the axis, for example, or also to different structures. The first detent and the second detent are engaged when the locking mechanism is in the locked position and disengaged when the locking mechanism is in a released position. The first detent and the second detent are formed for example by complementary structures that may be moved into engagement when the first and second detent are in various relative positions. The first detent and the second detent are formed for example by cooperating toothing systems that may be moved into releasable engagement.

The first detent and/or the second detent are for example arranged on a circular path about the axis of the arm support in such manner that the cooperating detent perform approximately the same relative movement between the locked position and the released position for any position of the arm support.

The first and/or the second detent are assigned for example to a latch movable between the locked position and the released position. The first and/or second detent are movable between the locked position and the released position for example by a translatory or a rotary movement or a mixed movement with translatory and rotary components.

The first detent are fastened rigidly to the arm support, for example. In this case, the second detent are movable between the locked position and the released position for example. The movement of the second detent into the locked position is then damped in at least a part of said movement.

According to an alternative, the first detent are movable between the locked position and the released position, and the second detent are arranged rigidly. In this case, the movement of the first detent into the locked position is then damped in at least a part of said movement.

According to a further alternative, the first detent and the second detent are movable between the locked position and the released position. The movement of the first detent and/or the second detent into the locked position is damped in at least a part of said movement.

At least a partial range of the movement of the locking mechanism between the released position and the locked position is carried out with damping by a damping element. That is to say the relative movement between the detent is damped at least in a part thereof. For example, the whole of the movement between the released position and the locked position is damped by a damping element. According to an alternative, one or more parts of the movement are damped and at least one other part of the movement is not damped. For example, a partial area comprising the movement of the detent into engagement is damped. For example, a partial area comprising the movement of a limit stop of the armrest into contact with a counter-stop on the structure to limit the pivot range of the arm support may be damped. In the aforementioned alternatives, the movement of the detent into contact is slowed by the damping element. The noise generated during this process is significantly reduced compared to the situation when the detent meet each other without damping.

The movement of the locking mechanism is damped in at least one direction. For the purposes of the invention, this means that damping takes place either of the movement of the locking mechanism from the locked position into the released position or alternatively damping takes place of the movement from the released position into the locked position, or alternatively damping takes place of the movement of from the locked position into the released position and from the released position into the locked position.

The damper may comprise for example a linear damper, a rotary damper or a viscoelastic foam as the damper.

The linear damper comprises for example a translationally movable piston rod connected to a detent, and whose movement is damped in at least one direction. The rotary damper comprises for example a rotating element whose movement is damped in at least one direction of rotation. The movement of the viscoelastic foam into its deformed position is damped, and/or the return movement thereof to its starting position is damped. The viscoelastic foam also has the advantage that it has a springy quality, so that it is able to move the detent into the locked position while moving into its starting position, for example. The damper may comprise several of the aforementioned dampers in combination, for example.

The first detent or the second detent are conformed on a lever, for example. The lever is pivotable between the released position and the engaged position, for example. The lever may be embodied as a two-armed lever, for example. It is then possible to construct the detent on one of the lever arms, for example. The other lever arm may be in contact with a restoring device or with the damper, for example.

According to one variation of the invention, the lever is biased in the locked position by a restoring device. The restoring device is formed by a spring, for example, which biases the lever in the locked position. Other restoring elements are also conceivable instead of a spring, however, such as hydraulic or pneumatic restoring devices, for example.

The damper is in contact with the latch for example at least in a movement area between the released position and the locked position. The damper is permanently in contact with the latch, for example. According to an alternative design, the damper is in contact with the latch in at least a partial range of the movement of the latch. This may comprise for example a partial range of the movement in which the first detent and the second detent engage with each other. In all alternatives, the damper is in contact with a lever of the latch, for example.

When the first detent and the second detent move into contact, the movement is damped by a damper at least in this movement range for example. However, the movement might also be damped at least in a range before the first detent and the second detent enter into contact with each other. The relative movement of the detent would then be slowed before they entered into contact, so that the noise is reduced when the first and second detent meet each other.

According to one embodiment, the damper is biased in contact with the latch by a restoring device, for example. In this way, the damper is held in contact with the detent moving between the released position and the locked position. A damper such as a piston rod of a hydraulic or pneumatic damping cylinder, may be held in contact with the latch, for example.

The first detent are on a lever arm for example connected in pivoting manner to the arm support in at least one pivot range of the arm support. For example, the lever arm may be fixedly connected with the arm support, and may pivot together therewith during all pivoting movements of the arm support. According to an alternative, the lever arm may form an articulation with the arm support, for example, so that the lever arm is connected in pivoting manner to the arm support in at least one pivot range thereof, and is not connected to the arm support in at least one pivot range thereof, and thus moves relative to the arm support. The lever arm may also serve to bridge a distance, so that the locking mechanism does not have to be arranged in the immediate vicinity of the arm support.

According to a second aspect, the invention relates to a seat with an armrest according to the first aspect of the invention.

BRIEF DESCRIPTION OF THE DRAWING

Further advantages of the invention will be made evident with reference to the schematic representation of an embodiment shown in the drawing. In the drawing.

SPECIFIC DESCRIPTION OF THE INVENTION

A complete armrest assembly is designated with reference number 10 in the figures. Identical reference numbers in the different figures denote corresponding parts, including when lower case letters are added or absent.

Figure 1:
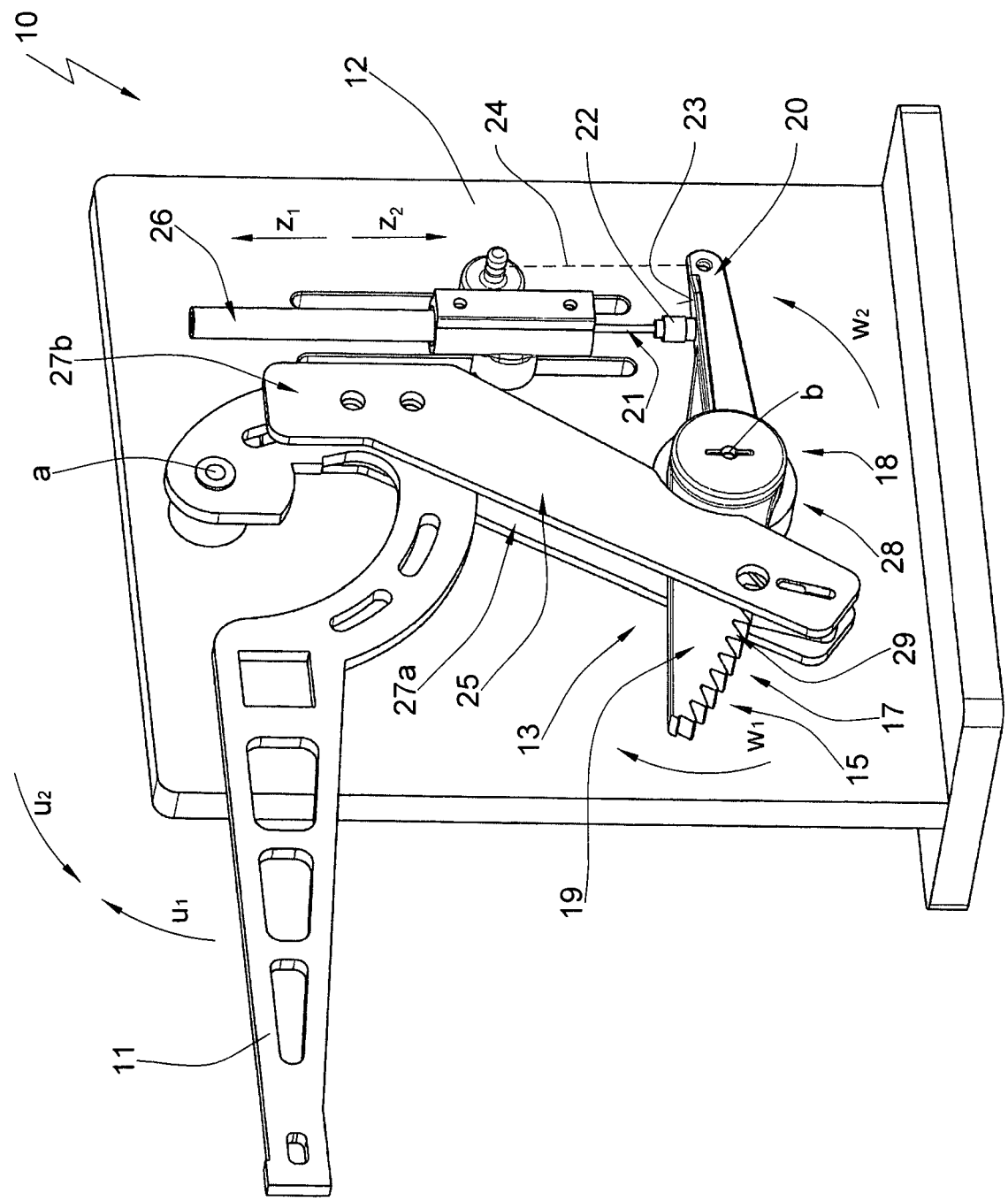
FIG. 1 is a perspective view of the armrest where the arm support section is shown in a lower end position and the locking mechanism is in the locked position.
Figure 2:
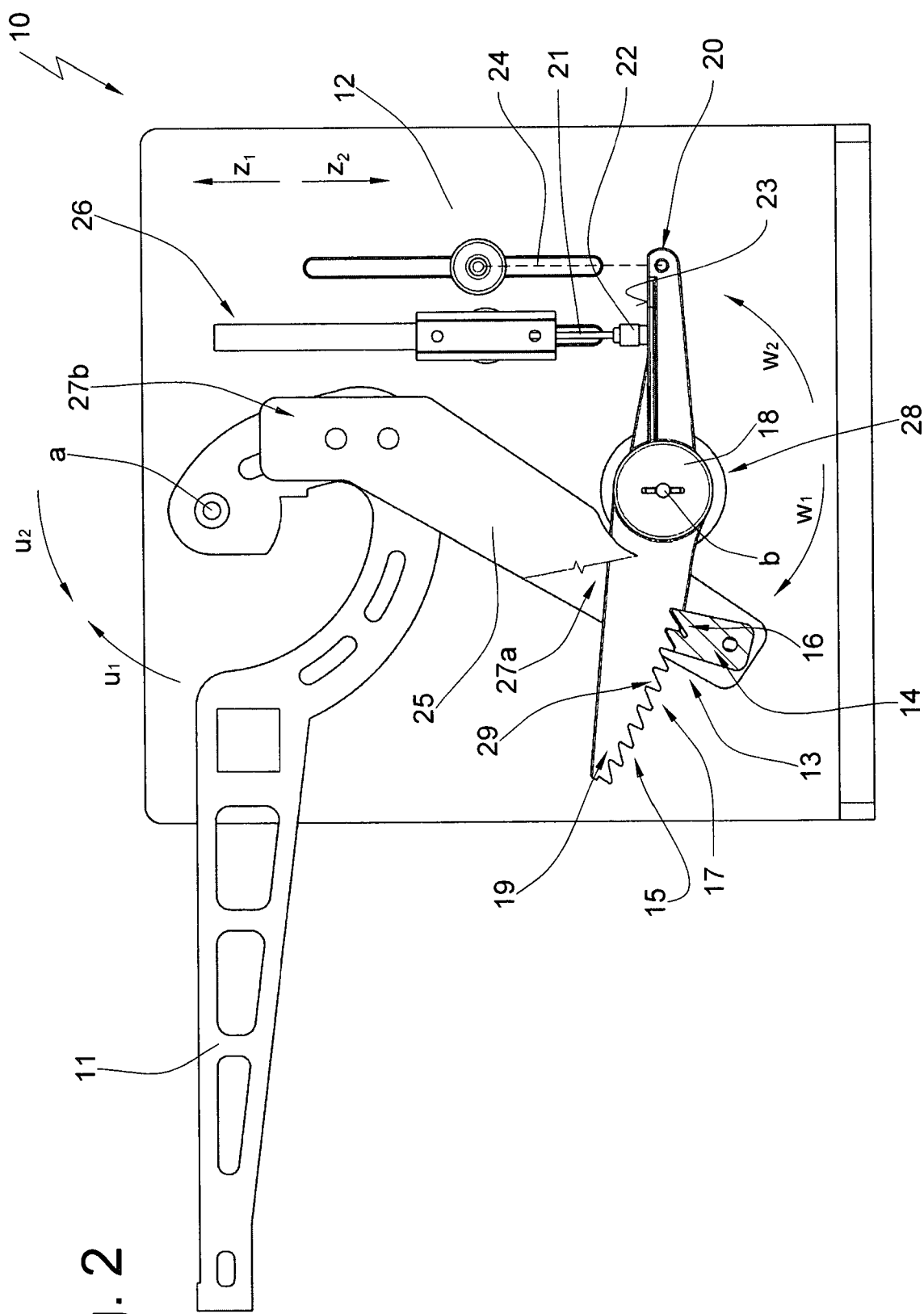
FIG. 2 is a side view of the armrest of FIG. 1 in the lower end position.

Armrest 10 comprises an arm support 11 pivotable about an axis a between an upper end position—not shown—in which arm support 11 is disposed approximately vertically, and a lower end position in which arm support 11 is disposed approximately horizontally. The upper end position and the lower end position may be defined by limit stops. From the lower end position shown in FIG. 2, arm support 11 may be pivoted in direction $u_1$ into the upper end position, that is not shown. From the upper end position, the arm support may be pivoted in direction $u_2$ into the lower end position. Axis a is on a structure 12 that may be for example a vehicle structure or a seat structure.

Armrest 10 comprises a locking mechanism 13 with a first detent 14 on the armrest body 11, and with a second detent 15 on the structure 12. The first detent 14 has teeth 16 fastened to the arm support 11, which teeth are realized in the embodiment in the form of two teeth 29, for example. The teeth 16 are between two retaining plates 27a and 27b fastened to arm support 11.

Second teeth 17 cooperate with the first teeth 16 as the second detent 15. The second teeth are embodied as a tooth system having a plurality of teeth 29 on a two-armed lever 18 mounted so as to be pivotable about an axis b. The second detent 15 are an approximately circular array about axis a. In this way, the pivot angle through which lever 18 travels between the locked position and the released position is roughly the same in all locked positions of arm support 11. Lever 18 is a part of a latch 28 that in the present embodiment assures movement of the second detent 15 between the locked position and the released position.

Lever 18 is biased in direction $w_2$ to engagement between the first detent 14 and the second detent 15, by a restoring force that in the present embodiment is supplied by a spring 24. Spring 24 is represented only schematically by a dashed line. According to an alternative variation, a torsion spring might also be arranged on axis b instead of spring 24 to bias lever 18 in direction $w_2$.

The locking mechanism may be shifted into the released position with an actuating means—not shown. In the present embodiment, the shift into the released position is effected by pivoting lever 18 in direction $w_1$. The locking mechanism may be designed as a form-aligning pawl, for example, so that a movement of arm support 11 in direction $u_1$ may take place without any actuation, because the locking mechanism moves into the released position automatically, whereas movement in direction $u_2$ is only possible if the locking mechanism has been shifted into the released position by the actuating mechanism.

The second detent 15 is on a first lever arm 19 of the lever 18. A second lever arm 20 is in contact with a piston rod 21 that is part of a damper 26. Piston rod 21 is in contact with the second lever arm 20 under the load of a restoring force in direction $z_2$. A contact member 22 of piston rod 21 bears on an upper side 23 of the second lever arm 20. Piston rod 21 moves in direction $z_2$ without damping. When the piston rod is loaded in opposite direction $z_1$, piston rod 21 is damped in direction $z_1$. Consequently, the movement of lever 18 is damped in direction $w_2$, because with this movement the piston rod is moved in direction $z_1$.

Piston rod 21 is a part of a standard commercial damper. Any other suitable damping system may be used instead of a damper 26 such as will be described for exemplary purposes in the following text.

Piston rod 21 is for example connected to a piston movable in a cylinder and divides the cylinder space into two chambers. A fluid is present in the cylinder. When the piston moves in direction $z_1$, only a limited flow volume of the fluid can get past the piston and flow from the first chamber into the second chamber, thereby damping the movement of the piston.

Figure 3:
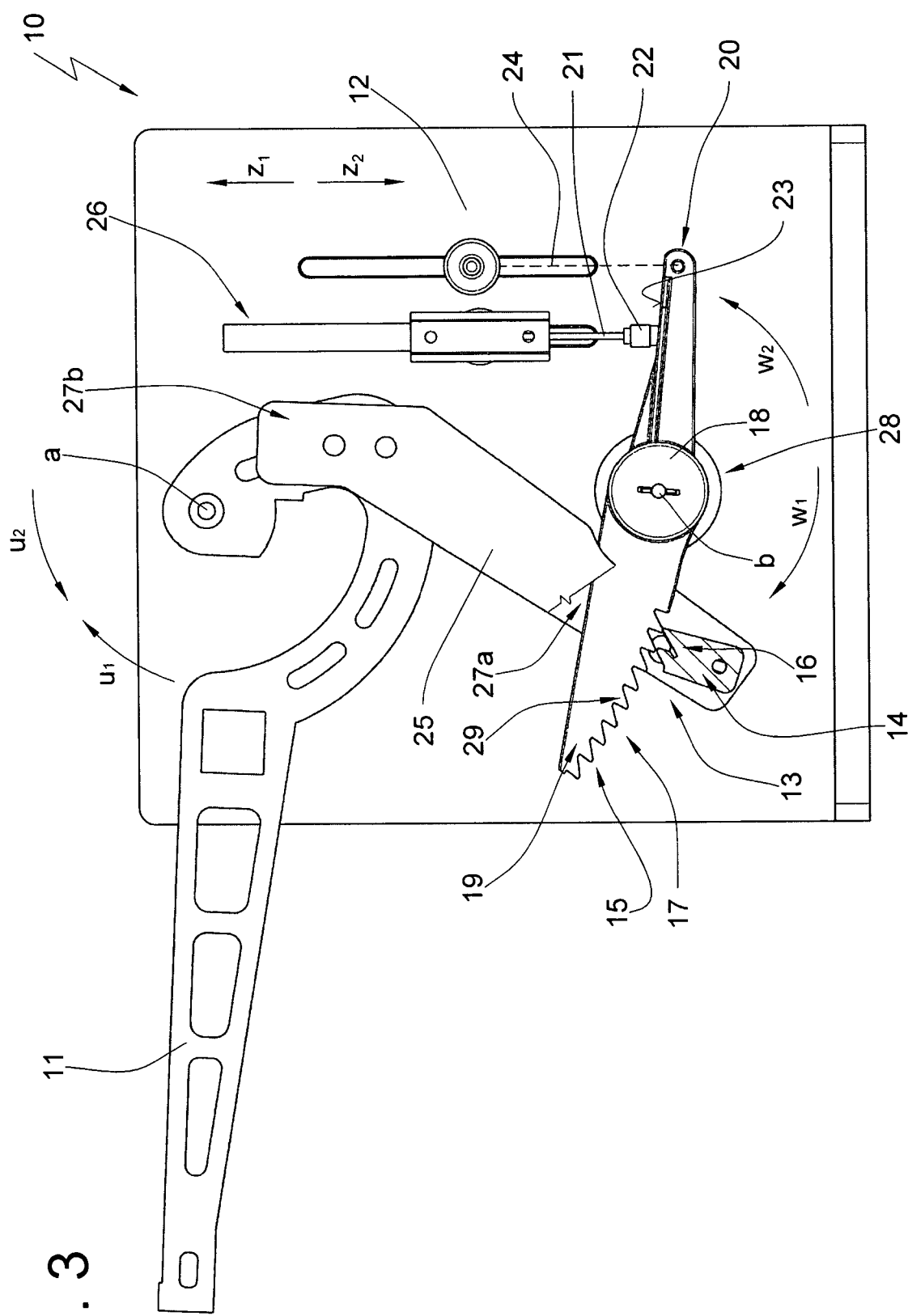
FIG. 3 is a side view of the armrest of FIG. 2 where the locking mechanism is shown in the released position.

In the following section, the function of armrest 10 will be described. When arm support 11 is pivoted in direction $u_1$, the first detent 14 also moves in direction $u_1$, because they are connected in pivoting manner with arm support 11 by arm 25. Since the first teeth 16 and the second teeth 17 are designed as a form-aligning pawl, in the present embodiment arm support 11 can be moved in direction $u_1$ without active displacement of locking mechanism 13. In the event of a movement of arm support 11 in direction $u_1$, locking mechanism 13 is moved automatically into the released position as lever 18 pivots into the released position because of the shape of teeth 16 and 17 and direction of movement of arm support 11 in direction $w_1$, wherein the first detent 16 and the second detent 17 disengage from each other automatically (see FIG. 3).

Figure 4:
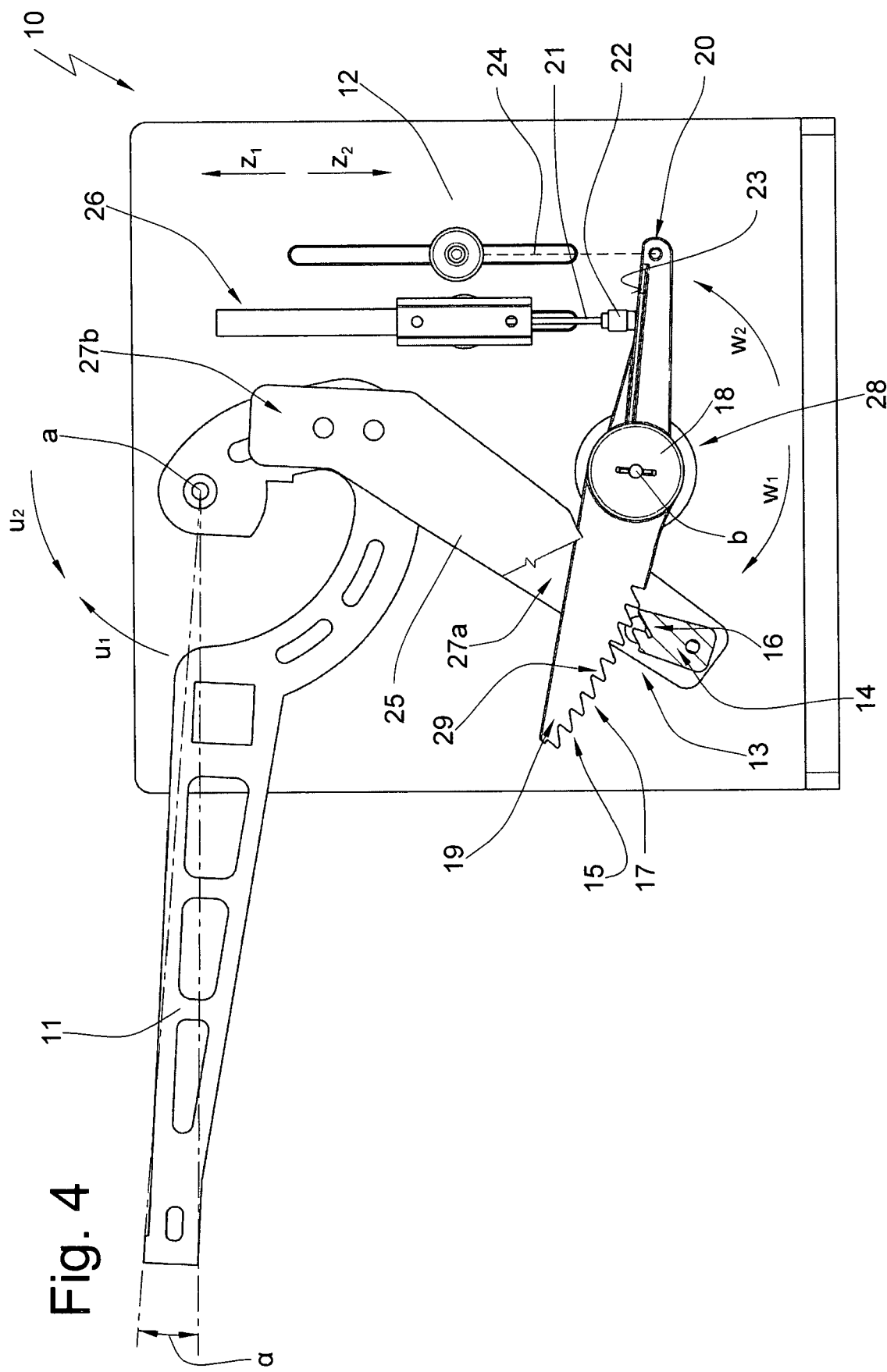
FIG. 4 is a side view of the armrest of FIG. 3 where the locking mechanism is in the released position and the armrest is pivoted slightly upward.
Figure 5:
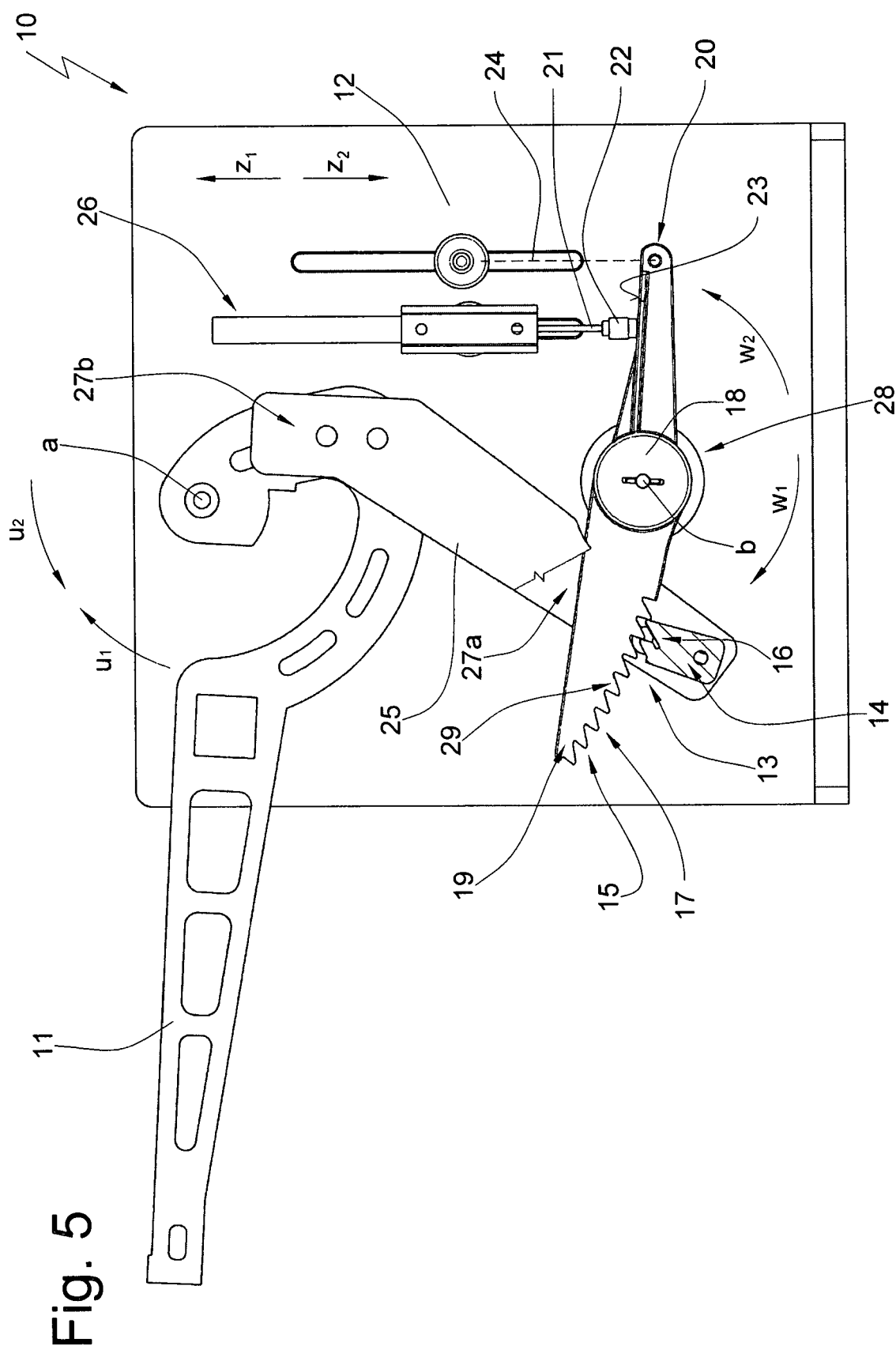
FIG. 5 is a side view of the armrest of FIG. 4 where the locking mechanism is moving into the locked position.
Figure 6:
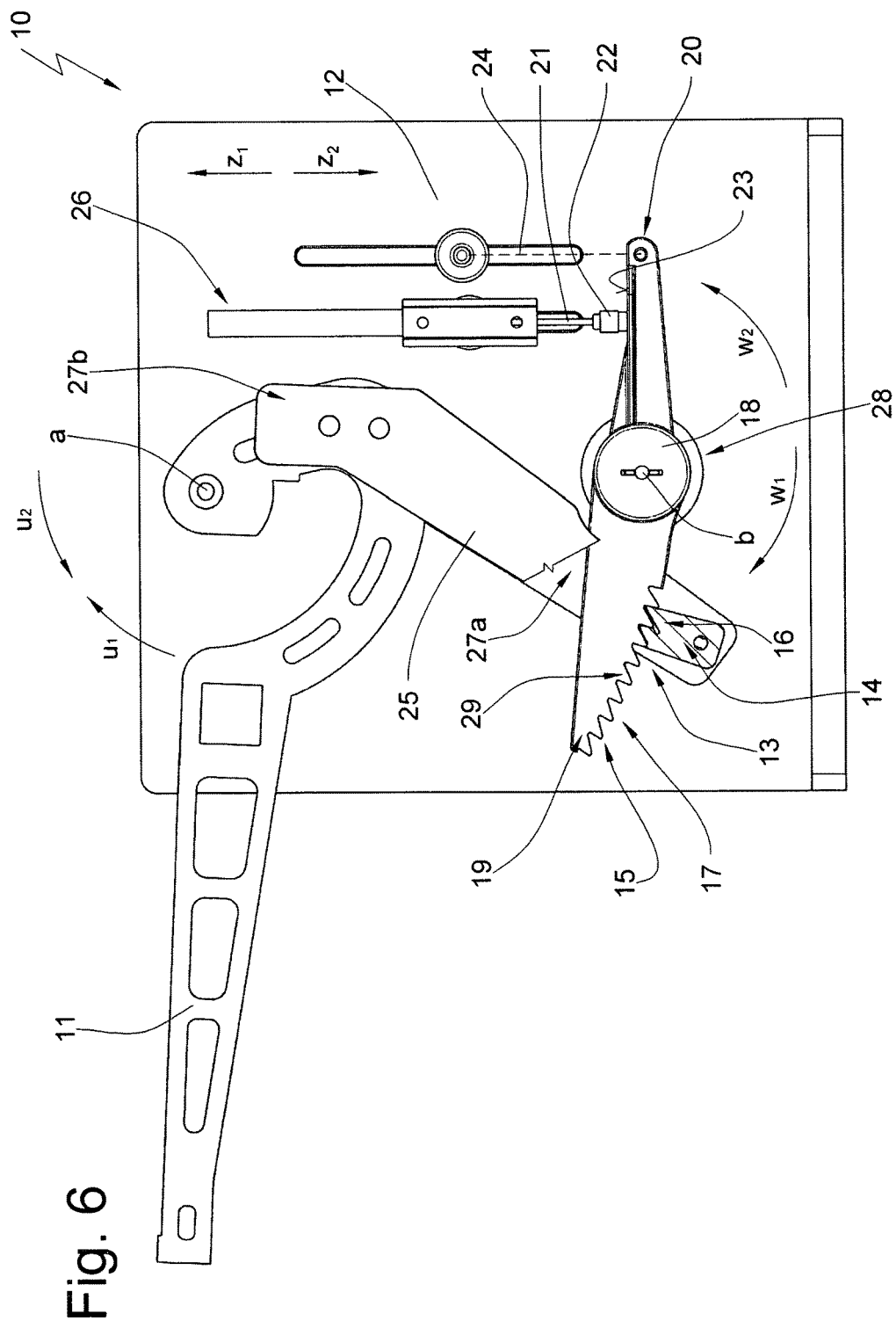
FIG. 6 is a side view of the armrest of FIG. 5 where the locking mechanism is in the locked position and the armrest is disposed in a second position of use.

Once arm support 11 has been pivoted through an angle a (see FIG. 4) into the desired position, locking mechanism 13 automatically moves into the locked position. Depending on the size of angle a, the first teeth 16 ratchet over one or more teeth of the second teeth 17. When arm support 11 is set in the desired position, lever 18 rotates in direction $w_2$ under the effect of its spring loading, and the first detent 16 and the second detent 17 are moved into engagement (see FIGS. 4, 5 and 6). When rotating, the second lever arm 20 moves in direction $w_2$, piston rod 21 moves in direction $z_1$.

In this way, the movement of lever 18 spring-biased in direction $w_2$ from the released position into the locked position is damped by damper 26, so that the first detent 16 and the second detent 17 move into contact with each other not suddenly but gradually. This in turn reduces the level of noise created substantially.

If arm support 11 is to be pivoted for example from a position in which it is pivoted upward in direction $u_1$ in direction $u_2$ toward the lower end position, lever 18 must be pivoted against the force of spring 24 in direction $w_1$ into the released position actively with the actuating means—not shown—, wherein the detent 14 and 15 move out of engagement. Piston rod 21 is then exposed to the restoring force described previously in direction $z_2$, and so moved in direction $z_2$ and in this way is kept in contact with lever arm 20. Arm support 11 can now be pivoted in direction $u_2$. As soon as the force is exerted on the actuating element, the locking mechanism moves in damped manner into the locked position, as described earlier.

According to an alternative variant of armrest 10, the locking mechanism for example does not include a form-aligning pawl. In this case, locking mechanism 13 must be shifted into the released position actively, by an actuating element, in order to pivot arm support 11 in direction $u_1$ or direction $u_2$. As soon as the force is exerted on the actuating means, the locking mechanism moves in damped manner into the locked position.

According to a further alternative—not shown—the second detent 15 might be construction not on a movable lever 18, but for example rigidly on structure 12. In this case, the first detent for example are movable between the locked position and the released position. In this case, the damper damps the movement of the first detent.

The invention claimed is:

1. An armrest comprising:
    a structure of a vehicle or seat of the vehicle;
    an arm support pivotable relative to the structure about an axis toward and away from a lower end position;
    a first detent on the arm support;
    a second detent on the structure, one of the first and second detents being movable toward and away from the other of the first and second detents between a locked position engaging the other detent of the first and second detents and a released position disengaged from the other of the first and second detents, the first detent and the second detent being engaged and preventing movement of the arm support toward the lower end position when the other of the first and second detents is in the locked position and disengaged when the other of the first and second detents is in the released position and thereby allowing pivoting of the arm support toward the lower end position; and
    a damper for damping at least a partial range of movement of the first and second detents on movement of the other of the first and second detents in one direction of movement between the released position and the locked position and for reducing noise generated by such movement, the damper having a body of a viscoelastic foam on at least one of the first and second detents that is constructed to bias the one of the first and second detents into the locked position by a restoring force and to damp the one of the first and second detents upon movement of the one of the first and second detents in the one direction between the released position and the locked position.

2. The armrest according to claim 1, wherein the damper is a linear damper, a rotary damper, or a viscoelastic foam.

3. The armrest according to claim 1, further comprising:
    a latch carrying the first detent or the second detent and movable between the locked position and the released position.

4. The armrest according to claim 1, wherein the one of the first and second detents is movable in a straight line or rotationally.

5. The armrest according to claim 1, further comprising:
    a restoring device biasing the one of the first and second detents into the locked position.

6. The armrest according to claim 3, wherein the damper is in contact with the latch.

7. The armrest according to claim 3, wherein the damper is biased into contact with the latch by a restoring device.

8. The armrest according to claim 1, wherein the first detent is on a lever arm of a lever that is pivotally mounted on the arm support in a least one pivot range of the arm support.

9. A vehicle seat with an armrest according to claim 1.

\* \* \* \* \*